United States Patent [19]
Brewer, III et al.

[11] Patent Number: 5,560,313
[45] Date of Patent: Oct. 1, 1996

[54] SHOCK MOUNT FRAME FOR COPIERS

[75] Inventors: Charles R. Brewer, III, Farmington; Douglas W. Gates, Rochester, both of N.Y.

[73] Assignee: Xerox Corporation, Stamford, Conn.

[21] Appl. No.: 537,014

[22] Filed: Oct. 2, 1995

[51] Int. Cl.$^6$ ................................................. B63B 35/00
[52] U.S. Cl. ........................................... 114/270; 248/638
[58] Field of Search ........................... 440/52; 114/191, 114/188, 270; 248/638, 618

[56] References Cited

U.S. PATENT DOCUMENTS

| | | | |
|---|---|---|---|
| 2,939,668 | 6/1960 | Driver | 114/188 |
| 3,469,809 | 9/1969 | Reznick et al. | 248/638 |
| 5,306,121 | 4/1994 | Heflin et al. | 248/638 |

Primary Examiner—Jesus D. Sotelo
Attorney, Agent, or Firm—William A. Henry, II

[57] ABSTRACT

A shock mounting assembly for attaching a copier/printer to shock mounts aboard a vessel. The assembly includes two steel supporting members attached to the base of the copier/printer that are easily and quickly screwed into two nonparallel shock mount frames with four jack screws to raise the copier/printer off its casters and restrain it in a fixed position. The four jack screws make detachment from the shock mount assembly a simple and time efficient process for repairmen.

17 Claims, 2 Drawing Sheets

SHOCK MOUNT FRAME FOR COPIERS

BACKGROUND OF THE INVENTION

This invention relates to a frame for mounting a machine or other apparatus to a ship, and more particularly, to a shock mount frame for mounting copier/printer to a ship.

Along with the need to make copies of documents onboard ships came the problem of how to mount the copy making product so as to make producing copies feasible. Unstable copy making products produced unacceptable copy and an unacceptable amount of downtime of the copy making products due to shock with parts being shaken loose and broken, as well as, misregistration of images on copy sheets. Repairpersons have to go through time consuming, costly and difficult procedures in moving the copy making products to gain access to parts thereof that need servicing and then replacing the copy making product in its original position. An answer to these problems included shock mounting the copy making product to the ship.

PRIOR ART

Originally, the first designs for shock mounting a copier to a ship were to permanently attach the copier to mounts that were welded to the ships deck. If service were needed the copier was either repaired in place (sometimes in very tight quarters) or the machine was taken off the mounts, which could take up to half an hour or more.

A second design used incorporated a "C" type frame that allowed the machine to be inserted into the frame, again be attached to the frame and then the assembly moved and jacked into position. This design required that the machine be attached to a permanent frame before placing into position. Also, the frame configuration prevented machine placement in tight quarters otherwise the frame would not clear the welded deck mounts if moved into position and no side movement allowed.

Other designs incorporate a heavy wound spring inside a woven steel sleeve. This is laid out on its side and the machine is permanently attached to the spring. (similar to a slinky laying on its side) Again, the machine is either serviced in place or removed, involving time and energy to remove and replace back onto the mount.

SUMMARY OF THE INVENTION

Accordingly, disclosed herein is a shock mounting assembly for attaching a copier/printer to shock mounts aboard a Naval vessel. The apparatus includes two steel supporting members attached to the base of the copier/printer that are easily and quickly screwed into two nonparallel shock mount frames with four jack screws to raise the copier/printer off its casters and restrain it in a fixed position. The four jack screws make detachment from the shock mount assembly a simple and time efficient process for repairpersons.

BRIEF DESCRIPTION OF THE DRAWINGS

All of the above-mentioned features and other advantages will be apparent from the example of one specific apparatus and its operation described hereinbelow. The invention will be better understood by reference to the following description of this one specific embodiment thereof, which includes the following drawing figures (approximately to scale) wherein.

DETAILED DESCRIPTION OF THE INVENTION

Figure 1:
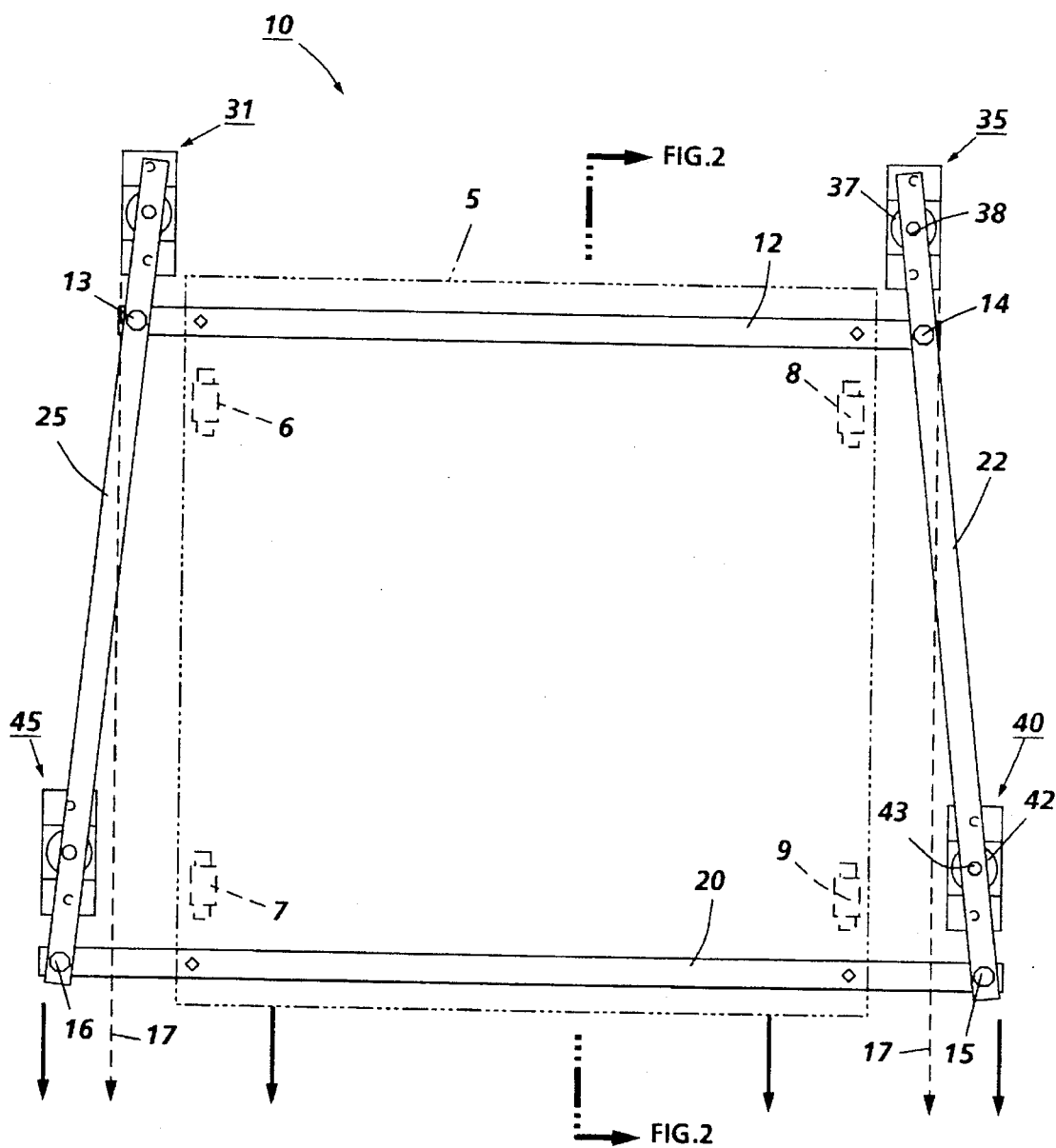
FIG. 1 is a schematic plan view of an electrophotographic machine mounted in the shock mount assembly of the present invention on the deck of a vessel.

For a general understanding of the features of the present invention, reference is made to the drawings. In the drawings, like reference numerals have been used throughout to identify identical elements. Referring to FIG. 1, there is shown an electrophotographic printing machine 5 composed of a plurality of programmable components and sub-systems which cooperate to carry out the copying or printing programs through a touch dialogue User Interface. However, it should be understood that the shock mount assembly of the present invention can be used with any machine that requires stabilizing onboard a ship.

Exemplary, conventional machine 5 shown here in phantom block form and shown in U.S. Pat. No. 5,049,929 which is incorporated herein by reference, employs a recirculating document handler having a document support surface onto which documents are placed. The documents are fed individually to an imaging station where they are imaged onto a photoconductive belt corresponding to the informational areas contained within a document at the imaging station. After imaging, each document is returned to the document handler support surface via a simplex path when either a simplex copy or the first pass of a duplex copy is being made or via a duplex path when a duplex copy is being made. Each image is developed on the photoreceptor, transferred and fused to copy sheets fed from a paper tray to an output tray or finisher. As a set of original document is loaded into the document handler, each document is transported by the document handler to the top of processor where copies are made. Upon completion, the original document will be transported back to the top of the document handler.

Figure 2:
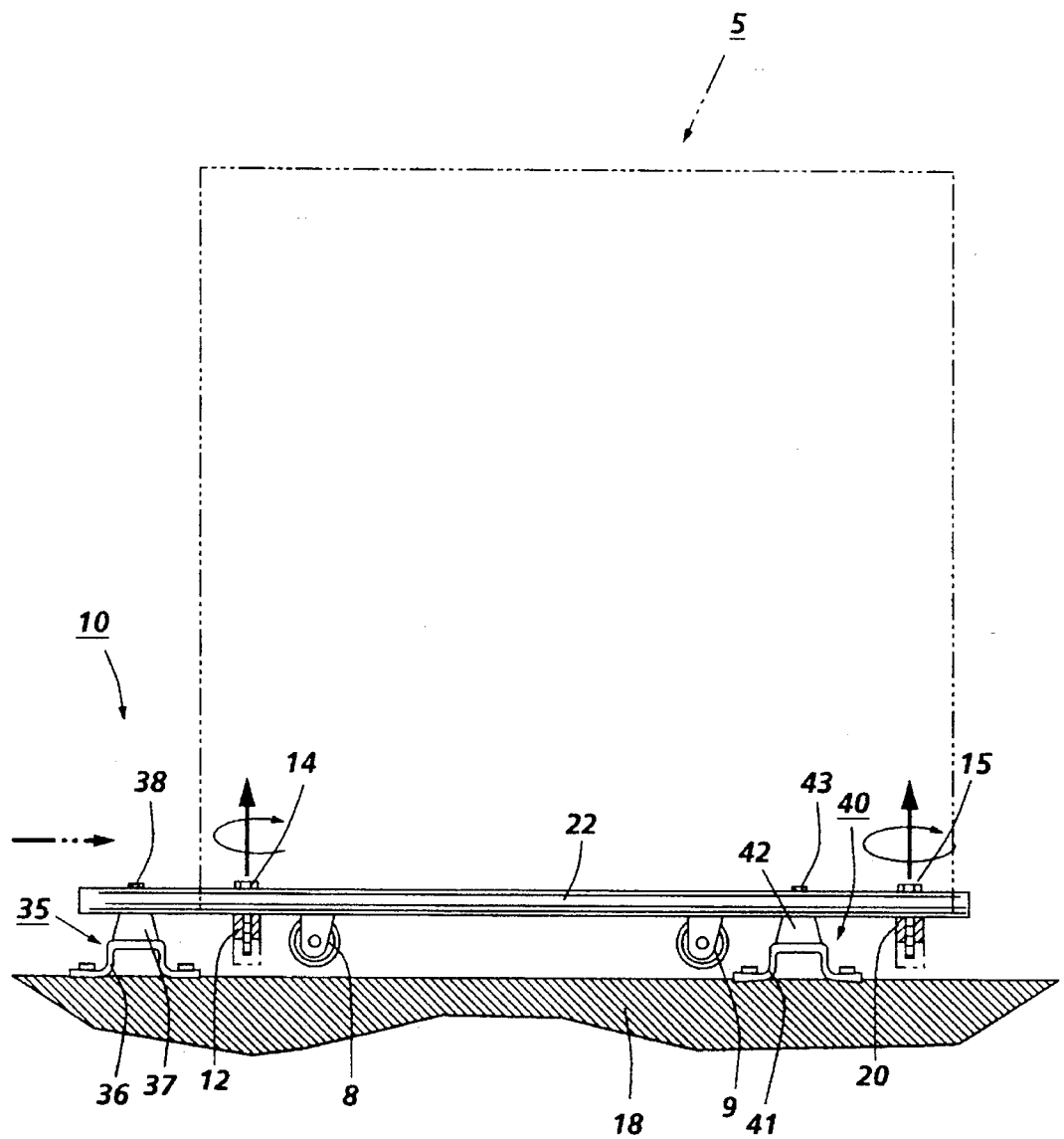
FIG. 2 is a partial, schematic view taken along line FIG. 2—FIG. 2 of the electrophotographic machine mounted in the shock mount assembly of FIG. 1.

As shown in FIGS. 1 and 2, and in accordance with the present invention, shock mount assembly 10 comprises a pair of attachment frame members 12 and 20 connected to the underside of machine 5 by conventional means, such as, screws, welding, etc. The attachment frame members 12 and 20 are positioned on opposite sides of machine 5 near edges of the machine and are parallel to the longest sides of the machine. Weldments 31, 35, 40 and 45 are positioned outside the confines of the machine and are attached to deck 18 of the vessel (not shown) by conventional means. The weldments near the front of the machine are offset from the weldments near the rear of the machine to allow for ease of movement of the machine into a predetermined position between the weldments and out of the predetermined position for repair. As shown more clearly in FIG. 2, weldments 35 and 40 include insulative, rubber-like boots 37 and 42, anchor members 36 and 41 and tie down bolts 38 and 43, respectively. Weldments 31 and 45 are identical in make-up to weldments 35 and 40. Nonparallel shock mount tubes 22 and 25 are attached by jacking bolts 13, 14, 15 and 16 to the top of attachment frame members 12 and 20 forming a trapezoidal configuration. This configuration allows the machine to be easily detached from the shock mounts and rolled on casters 8 and 9 away from the stationary shock mount tubes 22 and 25 for repair by a technician.

In operation of the shock mount assembly 10, a machine with attachment frame members 12 and 20 is moved into a predetermined position between the weldments to just in front of weldments 31 and 35. Holes in the attachment frame members are aligned with holes in shock mount tubes 22 and 25 and jacking bolts 13, 14, 15 and 16 are inserted into the holes in tubes 22 and 25 and rotated clockwise to jack attachment frame members 12 and 20 along with machine 5 up against shock mount tubes 22 and 25 thereby lifting casters 6, 7, 8 and 9 off deck 18 of the vessel. When service of the machine is required, all the technician has to do is unscrew the jacking bolts and roll the machine in the direction of dashed lines 17 of FIG. 1 away from the weldments. It should be understood that attachment frame members 12 and 20 remain with the machine at all times as shown in FIG. 1.

As will be readily understood from the foregoing description, the method and apparatus for shock mounting a machine to the deck of a vessel uses offsetting features of the layout of the shock mount weldments, along with specifically placed attachment points for upper frame members in the form of shock mount tubes, to allow clearance for rolling the machine for service and replacement when lowered and detained.

The invention has been described in detail with particular reference to the preferred embodiment thereof, but it will be understood that reasonable variations and modifications are possible without departing from the spirit and basic scope of the invention.

We claim:

1. An apparatus for shock mounting the frame of a machine for making copier of page image information to the deck of a ship, comprising:
    a pair of attachment frame members connected to the machine frame;
    at least four weldments attached to the deck of the ship;
    a pair of shock mount tubes; and
    jacking bolts for attaching said pair of attaching frame members to said shock mounting tubes such that manipulation of said jacking bolts serves to lift and secure the machine from the deck of the ship.

2. The apparatus of claim 1, wherein said pair of attachment frame members and said pair of shock mount tubes form a trapezoid.

3. The apparatus of claim 2, wherein said jacking bolts include at least four bolts.

4. The apparatus of claim 3, wherein said attaching frame members are positioned underneath said pair of shock mount tubes.

5. The apparatus of claim 4, wherein said attaching frame members are positioned in parallel.

6. The apparatus of claim 5, wherein said shock mount tubes are positioned nonparallel with respect to each other.

7. The apparatus of claim 6, wherein each of said weldments include a flexible boot.

8. A method for attaching a machine to a surface, comprising the steps of:
    attaching a pair of attachment frame members to the machine;
    providing at least four weldments positioned in a trapezoidal configuration;
    attaching a pair of shock mount tubes to said weldments; and
    using jack screws to attach said pair of attachment frame members to said pair of shock mount tubes in order to lift and secure the machine off the surface.

9. The method of claim 8, including the step of providing said weldments with flexible boots.

10. The method of claim 9, including the step of attaching said attaching frame members underneath said pair of shock mount tubes.

11. A shock mount frame for attaching shipboard copier/printers to a ship to enhance serviceability of the copier/printers, comprising:
    a pair of attachment frame members connected to the frame of a copier/printer;
    at least four weldments attached to the deck of the ship;
    a pair of shock mount tubes; and
    jacking bolts for attaching said pair of attaching frame members to said shock mounting tubes such that manipulation of said jacking bolts in a first direction serves to lift and secure the machine from the deck of the ship and manipulation of said jacking bolts in a second direction serves to lower the machine to the deck of the ship for movement into position for servicing.

12. The apparatus of claim 11, wherein said pair of attachment frame members and said pair of shock mount tubes form a trapezoid.

13. The apparatus of claim 12, wherein said jacking bolts include at least four bolts.

14. The apparatus of claim 13, wherein said attaching frame members are positioned underneath said pair of shock mount tubes.

15. The apparatus of claim 14, wherein said attaching frame members are positioned in parallel.

16. The apparatus of claim 15, wherein said shock mount tubes are positioned nonparallel with respect to each other.

17. The apparatus of claim 16, wherein each of said weldments include a flexible boot.

* * * * *